United States Patent
McCormick

(10) Patent No.: US 9,209,635 B2
(45) Date of Patent: Dec. 8, 2015

(54) PRE-CHARGING SYSTEM FOR A CAPACITOR IN A VOLTAGE INVERTER FOR AN ELECTRIC MOTOR

(71) Applicant: LG Chem, Ltd., Seoul (KR)

(72) Inventor: Richard McCormick, Troy, MI (US)

(73) Assignee: LG Chem, Ltd., Seoul (KR)

( * ) Notice: Subject to any disclaimer, the term of this patent is extended or adjusted under 35 U.S.C. 154(b) by 189 days.

(21) Appl. No.: 14/105,219

(22) Filed: Dec. 13, 2013

(65) Prior Publication Data

US 2015/0155732 A1    Jun. 4, 2015

Related U.S. Application Data

(60) Provisional application No. 61/910,497, filed on Dec. 2, 2013.

(51) Int. Cl.
| | | |
|---|---|---|
| *H02P 1/00* | (2006.01) | |
| *H02J 7/00* | (2006.01) | |
| *H02P 27/06* | (2006.01) | |
| *H02H 9/00* | (2006.01) | |

(52) U.S. Cl.
CPC ................ *H02J 7/0052* (2013.01); *H02H 9/00* (2013.01); *H02P 27/06* (2013.01)

(58) Field of Classification Search
CPC ....... H02H 9/001; G01R 31/028; H02M 1/32; H02P 27/06
See application file for complete search history.

(56) References Cited

U.S. PATENT DOCUMENTS

| | | |
|---|---|---|
| 5,408,842 A | 4/1995 | Goto et al. |
| 6,438,044 B2 | 8/2002 | Fukuda |
| 6,654,262 B2 | 11/2003 | Hussein et al. |
| 6,768,621 B2 | 7/2004 | Arnet et al. |

(Continued)

FOREIGN PATENT DOCUMENTS

| | | |
|---|---|---|
| JP | 767214 A | 3/1995 |
| JP | 07067214 A | 3/1995 |

(Continued)

OTHER PUBLICATIONS

U.S. Appl. No. 14/135,899 filed on Dec. 20, 2013 entitled Pre-Charging System for a Capacitor in an Electric Motor Voltage Inverter.

(Continued)

*Primary Examiner* — Karen Masih
(74) *Attorney, Agent, or Firm* — Buckert Patent & Trademark Law Firm, PC; John F. Buckert

(57) ABSTRACT

A pre-charging system for a capacitor in a voltage inverter for an electric motor is provided. The system includes a grounding contactor electrically coupled between a grounding terminal of a battery pack and a first end of the capacitor. The system further includes a pre-charging contactor and a resistor electrically coupled in series. The pre-charging contactor and the resistor are electrically coupled between a high voltage terminal of the battery pack and a second end of the capacitor. The microprocessor determines a total amount of energy supplied to the resistor and induces the pre-charging contactor to have an open operational position to electrically de-couple the high voltage terminal from the second end of the capacitor, if the total amount of energy is greater than a threshold amount of energy.

14 Claims, 8 Drawing Sheets

(56) References Cited

U.S. PATENT DOCUMENTS

| | | |
|---|---|---|
| 7,400,116 B2 | 7/2008 | Kato et al. |
| 7,688,023 B2 | 3/2010 | Yoon et al. |
| 8,456,878 B2 | 6/2013 | Min |
| 2005/0219195 A1 | 10/2005 | Yano et al. |
| 2006/0076934 A1 | 4/2006 | Ogata et al. |
| 2010/0225258 A1 | 9/2010 | Namuduri et al. |
| 2010/0277845 A1 | 11/2010 | Park et al. |
| 2011/0049977 A1 | 3/2011 | Onnerud et al. |
| 2013/0286692 A1* | 10/2013 | Patel et al. ............ 363/37 |
| 2015/0084404 A1 | 3/2015 | Hashim et al. |

FOREIGN PATENT DOCUMENTS

| | | |
|---|---|---|
| KR | 1020090075910 | 7/2009 |
| KR | 20100104079 A | 9/2010 |

OTHER PUBLICATIONS

U.S. Appl. No. 14/221,316 filed on Mar. 21, 2014 entitled Pre-Charging and Voltage Supply System for a DC-AC Inverter.

U.S. Appl. No. 14/258,113 filed on Apr. 22, 2014 entitled Voltage Supply System and Method for Disabling Operation of a DC-DC Voltage Converter.

* cited by examiner

| DELTA_T | PACK_VOLTAGE | LINK_VOLTAGE | AVERAGE_LINK_VOLTAGE | I_AVERAGE | P_AVERAGE | | E_AVERAGE | E_TOTAL |
|---|---|---|---|---|---|---|---|---|
| 0.00 | 400 | 0.0 | | | | | | 0 |
| 0.01 | 400 | 131.9 | 65.9 | 13.4 | 4464.0 | J1 | 44.6 | 44.6 |
| 0.02 | 400 | 220.3 | 176.1 | 9.0 | 2005.8 | J2 | 20.1 | 64.7 |
| 0.03 | 400 | 279.5 | 249.9 | 6.0 | 901.3 | J3 | 9.0 | 73.7 |
| 0.04 | 400 | 319.2 | 299.4 | 4.0 | 405.0 | J4 | 4.0 | 77.8 |
| 0.05 | 400 | 345.9 | 332.6 | 2.7 | 182.0 | J5 | 1.8 | 79.6 |
| 0.06 | 400 | 363.7 | 354.8 | 1.8 | 81.8 | J6 | 0.8 | 80.4 |
| 0.07 | 400 | 375.7 | 369.7 | 1.2 | 36.7 | J7 | 0.4 | 80.8 |
| 0.08 | 400 | 383.7 | 379.7 | 0.8 | 16.5 | J8 | 0.2 | 80.9 |
| 0.09 | 400 | 389.1 | 386.4 | 0.5 | 7.4 | J9 | 0.1 | 81.0 |
| 0.10 | 400 | 392.7 | 390.9 | 0.4 | 3.3 | J10 | 0.0 | 81.0 |

FIG. 7

PRE-CHARGING SYSTEM FOR A CAPACITOR IN A VOLTAGE INVERTER FOR AN ELECTRIC MOTOR

CROSS-REFERENCE TO RELATED APPLICATIONS

This application claims priority to U.S. Provisional Patent Application No. 61/910,497 filed on Dec. 2, 2013, the entire contents of which are hereby incorporated by reference herein.

BACKGROUND

The inventor herein has recognized a need for a pre-charging system for a capacitor in a voltage inverter for an electric motor that supplies an electrical current through a resistor to charge the capacitor that limits an amount of energy supplied to the resistor prevent degradation of the resistor.

SUMMARY

A pre-charging system for a capacitor in a voltage inverter for an electric motor in accordance with an exemplary embodiment is provided. The pre-charging system includes a grounding contactor electrically coupled between a grounding terminal of a battery pack and a first end of the capacitor in the voltage inverter. The pre-charging system further includes a pre-charging contactor and a resistor electrically coupled in series with one another. The pre-charging contactor and the resistor are electrically coupled between a high voltage terminal of the battery pack and a second end of the capacitor in the voltage inverter. The pre-charging system further includes a microprocessor programmed to generate a first control signal to induce the grounding contactor to have a closed operational position to electrically couple the grounding terminal of the battery pack to the first end of the capacitor. The microprocessor is further programmed to generate a second control signal to induce the pre-charging contactor to have a closed operational position to electrically couple the high voltage terminal through the resistor to the second end of the capacitor. The pre-charging system further includes a voltage measurement circuit configured to measure a first voltage level between the high voltage terminal and the grounding terminal of the battery pack. The voltage measurement circuit is further configured to generate a first voltage value indicating the first voltage level that is received by the microprocessor. The voltage measurement circuit is further configured to measure second, third, and fourth voltage levels between a first electrical line and the grounding terminal of the battery pack at first, second, and third times, respectively. The first electrical line is electrically coupled in series between the resistor and the second end of the capacitor. The third time is after the second time, and the second time is after the first time. The voltage measurement circuit is further configured to generate second, third, and fourth voltage values indicating the second, third, and fourth voltage levels, respectively, that are received by the microprocessor. The microprocessor is further programmed to determine a total amount of energy supplied to the resistor between the first time and the third time based on the first, second, third, and fourth voltage values and a resistance level of the resistor. The microprocessor is further programmed to stop generating the second control signal to induce the pre-charging contactor to have an open operational position to electrically de-couple the high voltage terminal from the second end of the capacitor, if the total amount of energy is greater than a threshold amount of energy.

A method for charging a capacitor in a voltage inverter for an electric motor in accordance with another exemplary embodiment is provided. The method includes providing a pre-charging circuit having a grounding contactor, a pre-charging contactor, a resistor, a voltage measurement circuit, and a microprocessor. The grounding contactor is electrically coupled between a grounding terminal of a battery pack and a first end of the capacitor in the voltage inverter. The pre-charging contactor and the resistor are electrically coupled in series with one another. The pre-charging contactor and the resistor are electrically coupled between a high voltage terminal of the battery pack and a second end of the capacitor in the voltage inverter. The method further includes generating a first control signal to induce the grounding contactor to have a closed operational position to electrically couple the grounding terminal of the battery pack to the first end of the capacitor, utilizing the microprocessor. The method further includes generating a second control signal to induce the pre-charging contactor to have a closed operational position to electrically couple the high voltage terminal through the resistor to the second end of the capacitor, utilizing the microprocessor. The method further includes measuring a first voltage level between the high voltage terminal and the grounding terminal of the battery pack, utilizing the voltage measurement circuit. The method further includes generating a first voltage value indicating the first voltage level that is received by the microprocessor, utilizing the voltage measurement circuit. The method further includes measuring second, third, and fourth voltage levels between a first electrical line and the grounding terminal of the battery pack at first, second, and third times, respectively, utilizing the voltage measurement circuit. The first electrical line is electrically coupled in series between the resistor and the second end of the capacitor. The third time is after the second time, and the second time is after the first time. The method further includes generating second, third, and fourth voltage values indicating the second, third, and fourth voltage levels, respectively, that are received by the microprocessor, utilizing the voltage measurement circuit. The method further includes determining a total amount of energy supplied to the resistor between the first time and the third time based on the first, second, third, and fourth voltage values and a resistance level of the resistor, utilizing the microprocessor. The method further includes stopping the generating of the second control signal to induce the pre-charging contactor to have an open operational position to electrically de-couple the high voltage terminal from the second end of the capacitor, if the total amount of energy is greater than a threshold amount of energy, utilizing the microprocessor.

BRIEF DESCRIPTION OF THE DRAWINGS

FIG. 7 is a table of exemplary battery pack voltage values, link voltage values, average link voltage values, average current values, average power values, and total energy values associated with the pre-charging system of FIG. 1.

DETAILED DESCRIPTION

Figure 1:
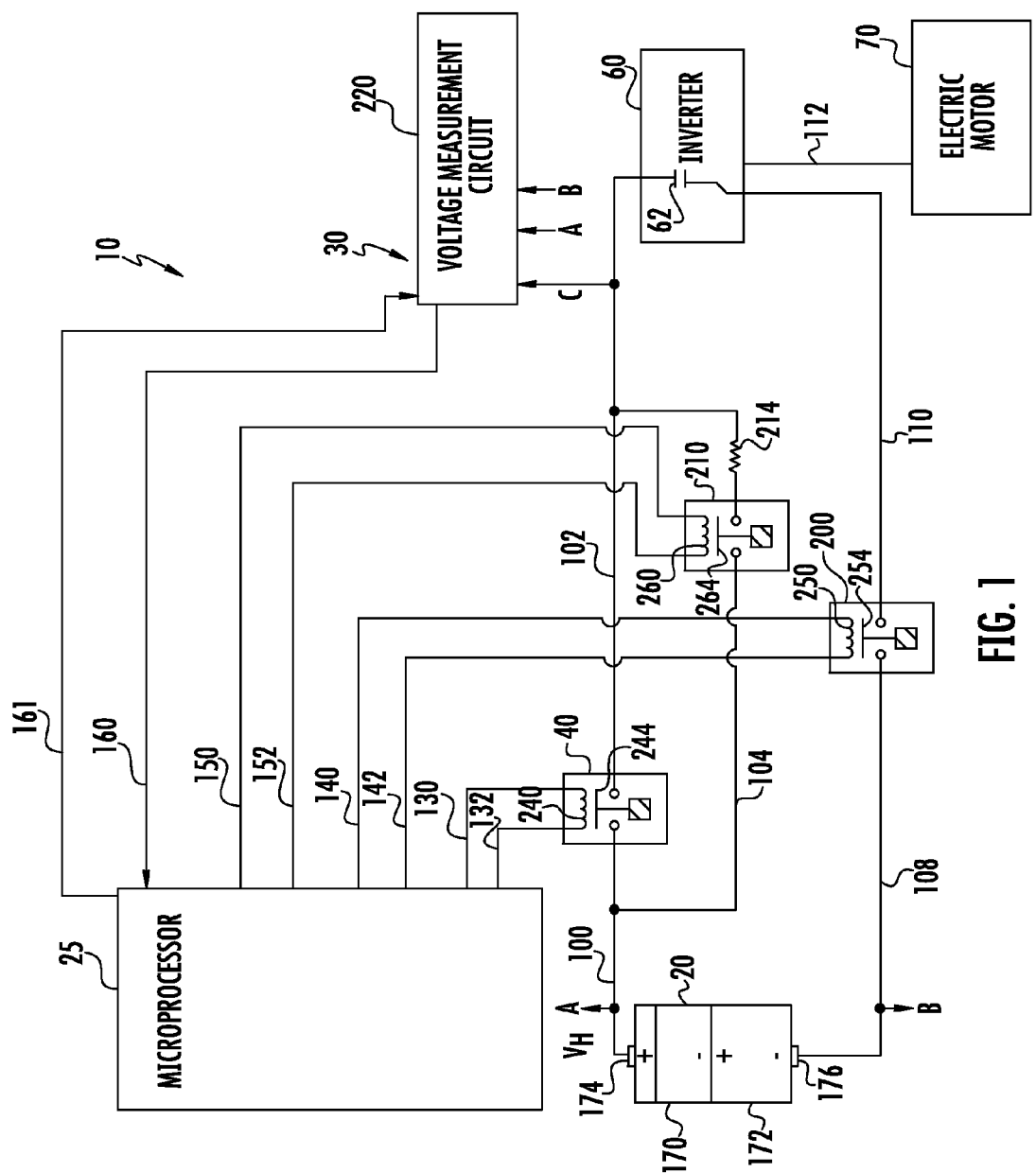
FIG. 1 is a block diagram of an electric vehicle having a pre-charging system in accordance with an exemplary embodiment.

Referring to FIG. 1, an electric vehicle 10 having a pre-charging system 30 in accordance with an exemplary embodiment for pre-charging a capacitor 62 in a voltage inverter 60 for an electric motor 70. The electric vehicle 10 includes a battery pack 20, a microprocessor 25, the pre-charging system 30, a main contactor 40, the voltage inverter 60, the electric motor 70, and electrical lines 100, 102, 104, 106, 108, 110, 112, 130, 132, 140, 142, 150, 152, 160, 161. An advantage of the pre-charging system 30 is that the system 30 charges the capacitor 62 in the voltage inverter 60 while limiting a total amount of energy flowing through the pre-charging resistor 214 electrically coupled to the capacitor 62. The pre-charging system 30 charges the capacitor 62 so that when the main contactor 40 subsequently supplies a high voltage from the battery pack 20 to the capacitor 62, an amount of instantaneous inrush current is reduced.

The battery pack 20 is configured to output an operational voltage to the voltage inverter 60 which outputs operational voltages to the electric motor 70 via the electrical lines 112. The battery pack 20 includes battery modules 170, 172 electrically coupled in series with one another. The battery pack 20 further includes a high-voltage terminal 174 and a ground terminal 176.

The microprocessor 25 is programmed to generate control signals to control operation of the main contactor 40, the grounding contactor 200, and the pre-charging contactor 210. In particular, the microprocessor 25 is programmed to generate a control signal to induce the grounding contactor 200 to have a closed operational position, and to generate another control signal to induce the pre-charging contactor 210 to have a closed operational position to charge the capacitor 62. The microprocessor 25 is further programmed to generate a control signal to induce the main contactor 40 to have a closed operational position when the charging of the capacitor 62 is completed.

The microprocessor 25 is electrically coupled to the grounding contactor 200 via the electrical lines 140, 142. The grounding contactor 200 includes a grounding contactor coil 250 and a contact 254. The microprocessor 25 is programmed to generate a high logic voltage on the electrical lines 140, 142 to energize the grounding contactor coil 250 to induce the contact 254 to move to a closed operational position. When the contact 254 has the closed operational position, a first end of the capacitor 62 is electrically coupled to the ground terminal 176 of the battery pack 20.

The microprocessor 25 is electrically coupled to the pre-charging contactor 210 via the electrical lines 150, 152. The pre-charging contactor 210 includes a pre-charging contactor coil 260 and a contact 264. The microprocessor 25 is programmed to generate a high logic voltage on the electrical lines 150, 152 to energize the pre-charging contactor coil 260 to induce the contact 264 to move to a closed operational position. When the contact 264 has the closed operational position, a second end of the capacitor 62 is electrically coupled through the resistor 214 to the high voltage terminal 174 of the battery pack 20.

The microprocessor 25 is electrically coupled to the main contactor 40 via the electrical lines 130, 132. The main contactor 40 includes a main contactor coil 240 and a contact 244. The microprocessor 25 is programmed to generate a high logic voltage on the electrical lines 130, 132 to energize the main contactor coil 240 to induce the contact 244 to move to a closed operational position. When the contact 244 has the closed operational position, a second end of the capacitor 62 is electrically coupled to the high voltage terminal 174 of the battery pack 20. When both of the contacts 244, 254 have closed operational positions, the voltage inverter 60 is electrically coupled between the high voltage terminal 174 and the ground terminal 176 of the battery pack 20, to supply operational voltages to the electric motor 70.

The pre-charging system 30 is provided to charge the capacitor 62 in the voltage inverter 60 while limiting an amount of energy being supplied to the pre-charging resistor 214. The pre-charging system 30 includes the microprocessor 25, the grounding contactor 200, the pre-charging contactor 210, the resistor 214, and a voltage measurement circuit 220.

Figure 2:
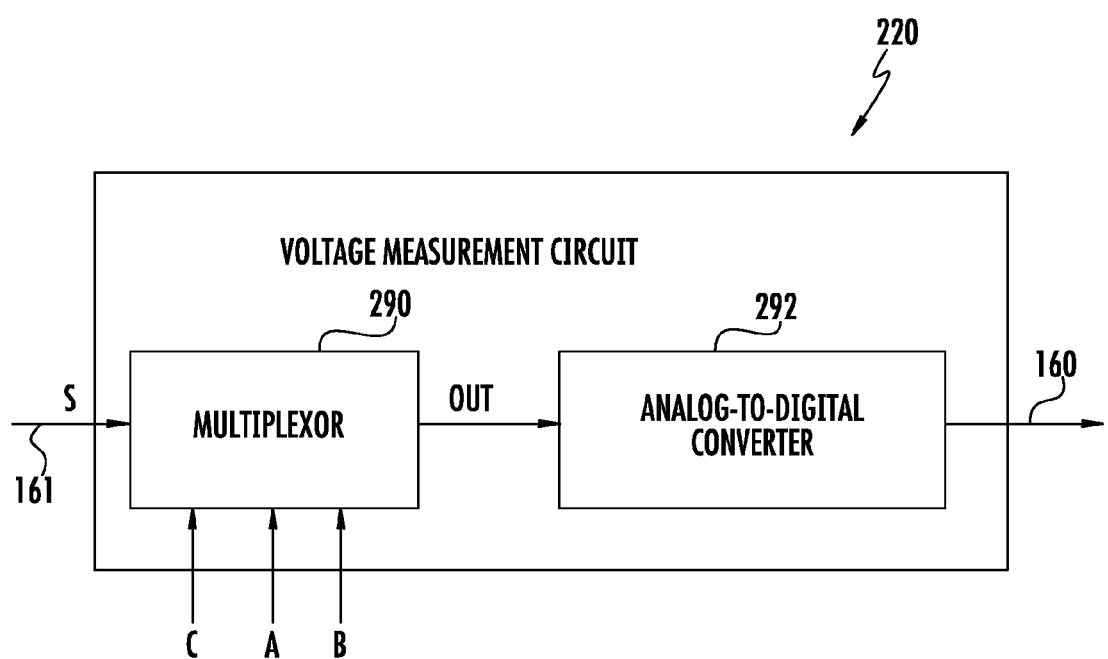
FIG. 2 is a block diagram of a voltage measurement circuit utilized in the pre-charging system of FIG. 1.
Figure 3:
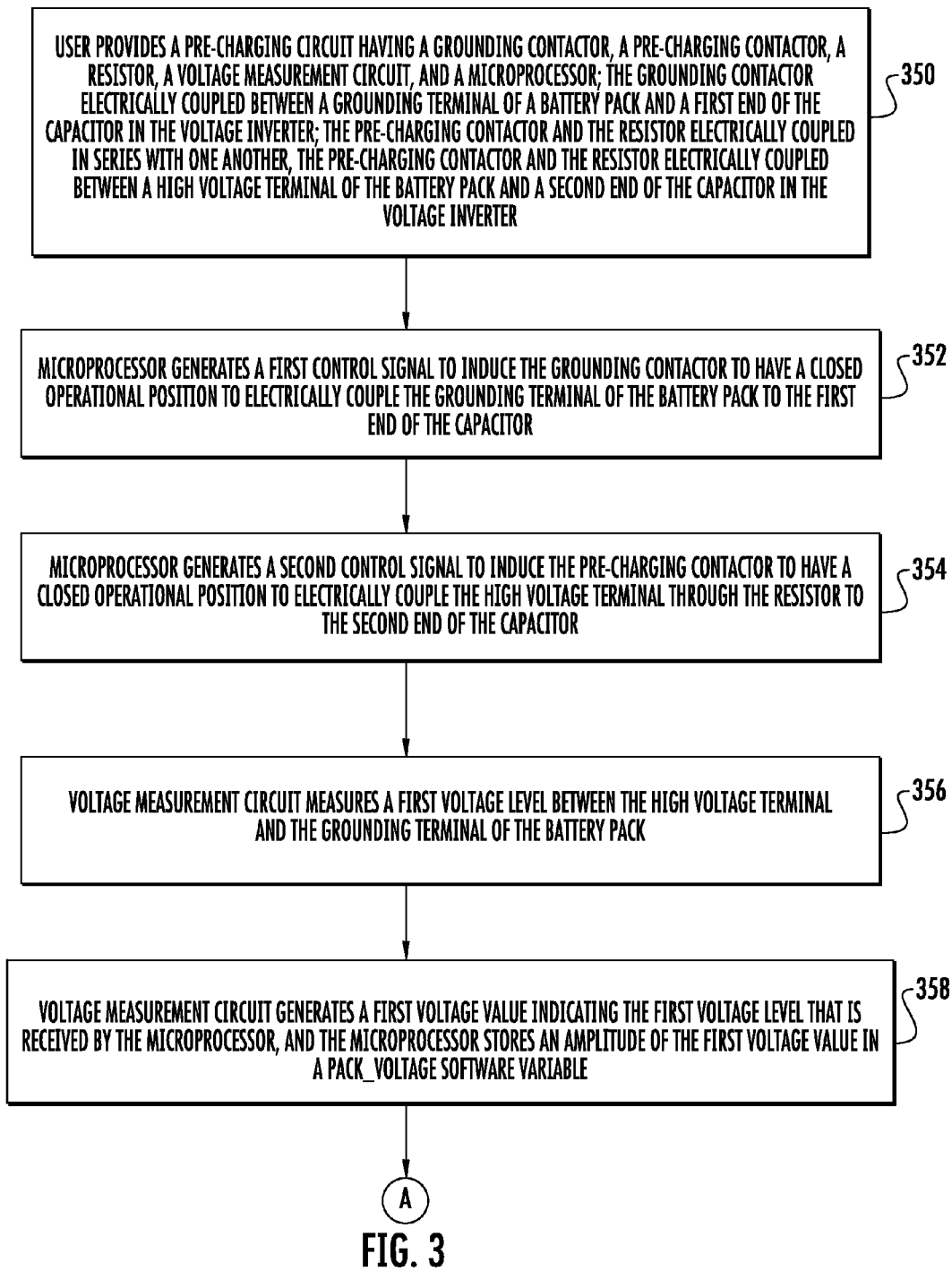
FIGS. 3-6 are flowcharts of a method for charging a capacitor in a voltage inverter for an electric motor in accordance with another exemplary embodiment.
Figure 4:
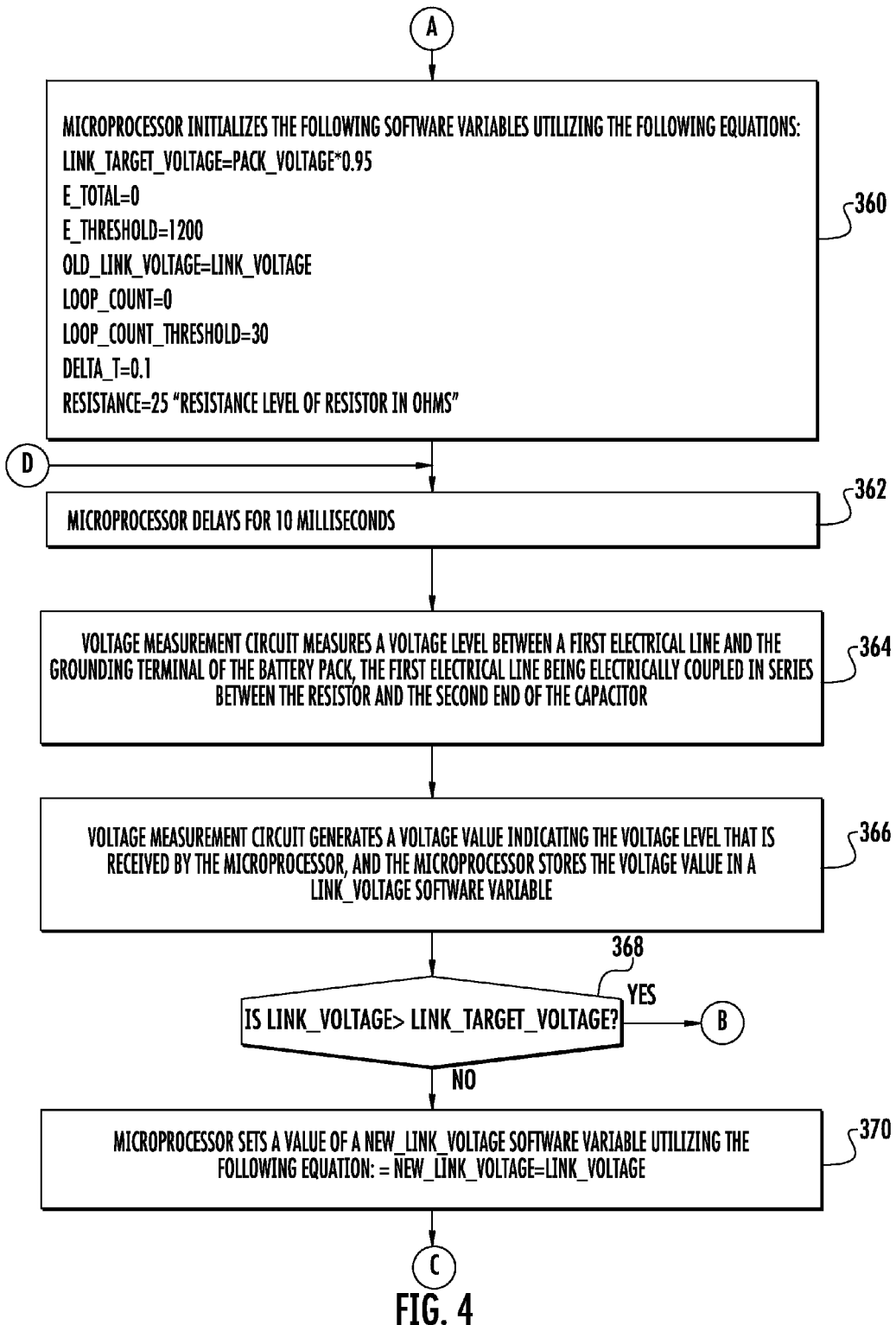
Figure 5:
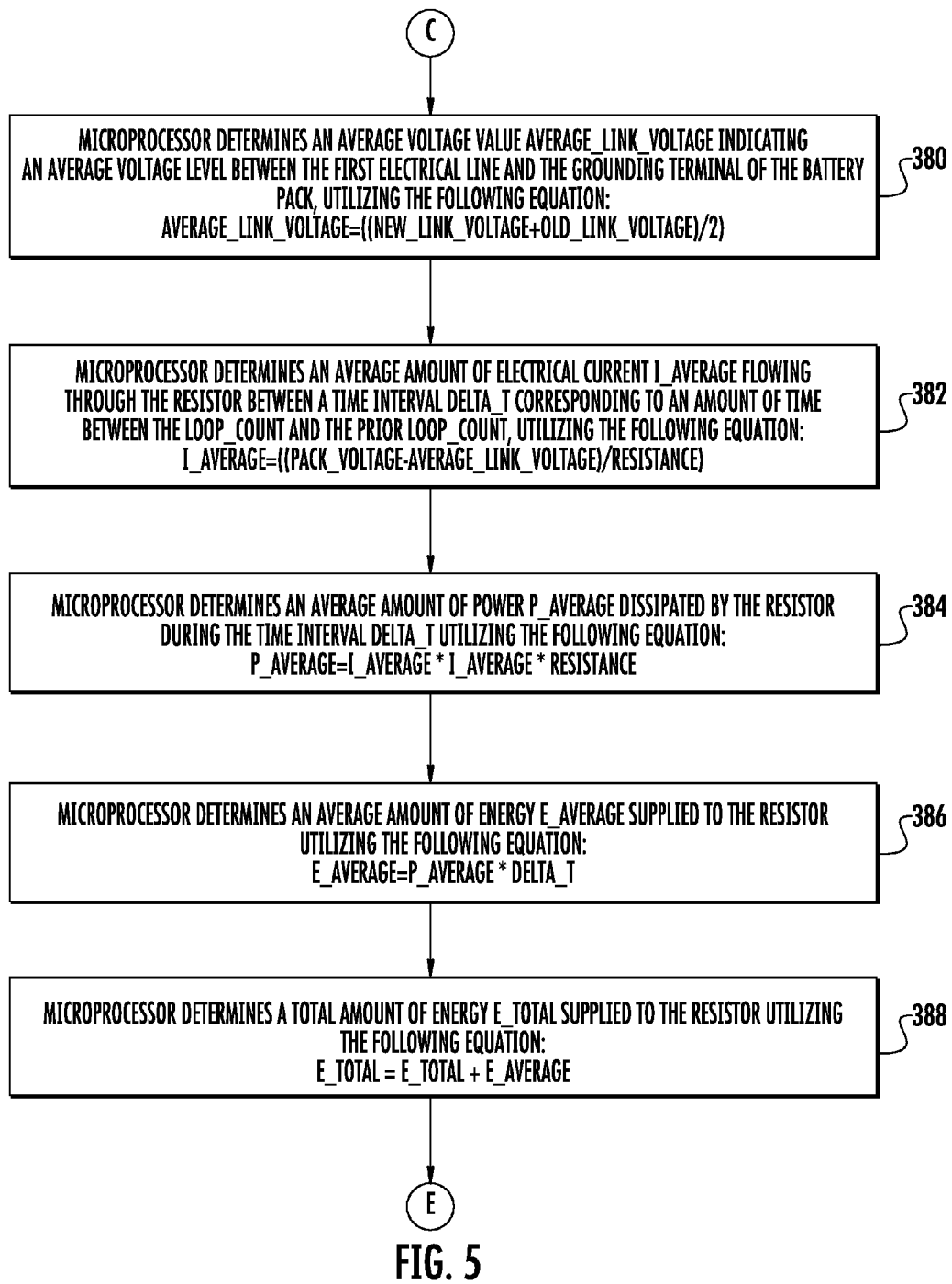
Figure 6:
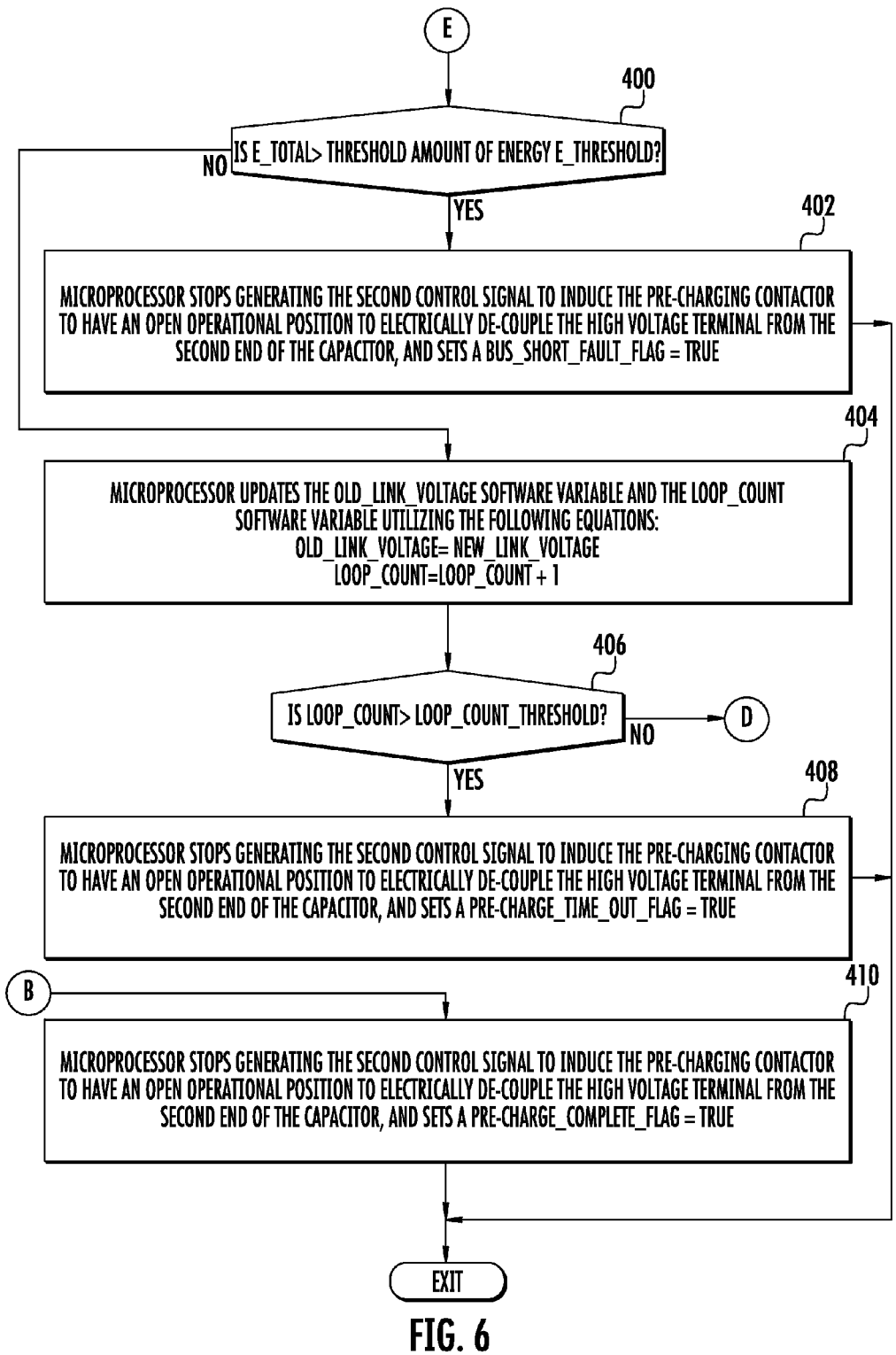

Referring to FIGS. 1 and 2, the voltage measurement circuit 220 includes a multiplexer 290 and an analog-to-digital converter 292 operably coupled to the multiplexer 290. The multiplexer has input terminals A, B, C coupled to the electrical lines 102, 100, 108, respectively. Further, the multiplexer 290 has a select terminal S electrically coupled to the electrical line 161. The multiplexor 290 receives a select signal on the select terminal S from the microprocessor 25 and selects one of the voltages on the terminals A, B, C to route through an output terminal OUT to the analog-to-digital converter 292. Accordingly, the multiplexer 290 receives first, second, and third select signals on the select terminal S from the microprocessor 25 to route the voltages on the terminals A, B, C, respectively, through the output terminal OUT to the analog-to-digital converter 292.

The analog-to-digital converter 292 is configured to receive a voltage from the OUT terminal of the multiplexer 290. Further, the analog-to-digital converter 292 is configured to measure an amplitude of the received voltage and to generate a binary voltage value indicating the amplitude of the received voltage. The analog-to-digital converter 292 transmits the binary voltage value through the electrical line 161 to the microprocessor 25.

During operation, the voltage measurement circuit 220 is configured to measure a voltage level between the high voltage terminal 174 and the ground terminal 176 of the battery pack 20. The voltage measurement circuit 220 is further configured to generate a binary voltage value indicating the voltage level between the high voltage terminal 174 and the ground terminal 176 that is received by the microprocessor 25.

The voltage measuring circuit 220 is further configured to measure a voltage level between the electrical line 102 and the ground terminal 176 of the battery pack 20. The voltage measurement circuit 220 is further configured to generate a binary voltage value indicating the voltage level between the electrical line 102 and the ground terminal 176 that is received by the microprocessor 25.

Referring to FIGS. 1-6, a flowchart of a method for charging the capacitor 62 in the voltage inverter 60 in accordance with an exemplary embodiment will now be described. The flowchart has a primary loop from step 362 to step 406 that can be executed in an amount of time designated as DELTA_T. Thus, the primary loop can be initially executed at substantially a first time, then executed again at substantially a second time, and then executed again at substantially a third time for example.

At step 350, a user provides the pre-charging system 30 having the grounding contactor 200, the pre-charging contactor 210, the resistor 214, the voltage measurement circuit 220, and the microprocessor 25. The grounding contactor 200 is electrically coupled between the ground terminal 176 of the battery pack 20 and a first end of the capacitor in the voltage inverter 60. The pre-charging contactor 210 and the resistor 214 are electrically coupled in series with one another. The pre-charging contactor 210 and the resistor 214 are electrically coupled between the high voltage terminal 174 of the battery pack 20 and a second end of the capacitor 62 in the voltage inverter 60.

At step 352, the microprocessor 25 generates a first control signal to induce the grounding contactor 200 to have a closed operational position to electrically couple the grounding terminal 176 of the battery pack 20 to the first end of the capacitor 62. After step 352, the method advances to step 354.

At step 354, the microprocessor 25 generates a second control signal to induce the pre-charging contactor 210 to have a closed operational position to electrically couple the high voltage terminal 174 through the resistor 214 to the second end of the capacitor 62. After step 354, the method advances to step 356.

At step 356, the voltage measurement circuit 220 measures a first voltage level between the high voltage terminal 174 and the grounding terminal 176 of the battery pack 20. After step 356, the method advances to step 358.

At step 358, the voltage measurement circuit 220 generates a first voltage value (e.g., a binary voltage value) indicating the first voltage level, that is received by the microprocessor 25, and the microprocessor 25 stores an amplitude of the first voltage value in a PACK_VOLTAGE software variable. After step 358, the method advances to step 360.

At step 360, the microprocessor 25 initializes the following software variables utilizing the following equations:

LINK_TARGET_VOLTAGE=PACK_VOLTAGE*0.95

E_TOTAL=0

E_THRESHOLD=1200

OLD_LINK_VOLTAGE=LINK_VOLTAGE

LOOP_COUNT=0

LOOP_COUNT_THRESHOLD=30

DELTA_T=0.1

RESISTANCE=25 "resistance level of resistor 214 in ohms."

After step 360, the method advances to step 362.

At step 362, the microprocessor 25 delays for 10 milliseconds. After step 362, the method advances to step 364.

At step 364, the voltage measurement circuit 220 measures a voltage level between the first electrical line 102 and the grounding terminal 176 of the battery pack 20. The first electrical line 102 is electrically coupled in series between the resistor 214 and the second end of the capacitor 62. After step 364, the method advances to step 366.

At step 366, the voltage measurement circuit 220 generates a voltage value (e.g., a binary voltage value) indicating an amplitude of the voltage level (of step 364), that is received by the microprocessor 25, and the microprocessor 25 stores the voltage value in a LINK_VOLTAGE software variable. After step 366, the method advances to step 368.

At step 368, the microprocessor 25 makes a determination as to whether the LINK_VOLTAGE is greater than the LINK_TARGET_VOLTAGE. If the value of step 368 equals "yes", the method advances to step 410. Otherwise, the method advances to step 370.

At step 370, the microprocessor 25 sets a value of a NEW_LINK_VOLTAGE software variable utilizing the following equation: =NEW_LINK_VOLTAGE= LINK_VOLTAGE. After step 370, the method advances to step 380.

At step 380, the microprocessor 25 determines an average voltage value AVERAGE_LINK_VOLTAGE indicating an average voltage level between the first electrical line 102 and the grounding terminal 176 of the battery pack 20, utilizing the following equation: AVERAGE_LINK_VOLTAGE =((NEW_LINK_VOLTAGE+OLD_LINK_VOLTAGE)/2). After step 380, the method advances to step 382.

At step 382, the microprocessor 25 determines an average amount of electrical current I_AVERAGE flowing through the resistor 214 between a time interval DELTA_T corresponding to substantially an amount of time between the LOOP_COUNT and the prior LOOP_COUNT, utilizing the following equation: I_AVERAGE=((PACK_VOLTAGE−AVERAGE_LINK_VOLTAGE)/RESISTANCE). After step 382, the method advances to step 384.

At step 384, the microprocessor 25 determines an average amount of power P_AVERAGE dissipated by the resistor 214 during the time interval DELTA_T utilizing the following equation:
P_AVERAGE=I_AVERAGE*I_AVERAGE*RESISTANCE. After step 384, the method advances to step 386.

At step 386, the microprocessor 25 determines an average amount of energy E_AVERAGE supplied to the resistor 214 utilizing the following equation: E_AVERAGE=P_AVERAGE*DELTA_T. After step 386, the method advances to step 388.

At step 388, the microprocessor 25 determines a total amount of energy E_TOTAL supplied to the resistor 214 utilizing the following equation: E_TOTAL=E_TOTAL+E_AVERAGE. After step 388, the method advances to step 400.

At step 400, the microprocessor 25 makes a determination as to whether E_TOTAL is greater than the threshold amount of energy E_THRESHOLD. If the value of step 400 equals "yes", the method advances to step 402. Otherwise, the method advances to step 404.

At step 402, the microprocessor 25 stops generating the second control signal to induce the pre-charging contactor 210 to have an open operational position to electrically de-couple the high voltage terminal 174 from the second end of the capacitor 62, and sets a BUS_SHORT_FAULT_FLAG equal to true. After step 402, the method is exited.

Referring again to step 400, if the value of step 400 equals "no", the method advances to step 404. At step 404, the microprocessor 25 updates the OLD_LINK_VOLTAGE software variable and the LOOP_COUNT software variable utilizing the following equations: OLD_LINK_VOLTAGE=NEW_LINK_VOLTAGE; and LOOP_COUNT=LOOP_COUNT+1. After step 404, method advances to step 406.

At step 406, the microprocessor 25 makes a determination as to whether LOOP_COUNT is greater than LOOP_COUNT_THRESHOLD. If the value step 406 equals "yes", the method advances to step 408. Otherwise, the method returns to step 362.

At step 408, the microprocessor 25 stops generating the second control signal to induce the pre-charging contactor 210 to have an open operational position to electrically de-couple the high voltage terminal 174 from the second end of the capacitor 62, and sets a PRE-CHARGE_TIME_OUT_FLAG equal to true. After step 408, the method is exited.

Referring again to step 368, if the value of step 368 equals "yes", the method advances to step 410. At step 410, the microprocessor 25 stops generating the second control signal to induce the pre-charging contactor 210 to have an open operational position to electrically de-couple the high voltage terminal 174 from the second end of the capacitor 62, and sets a PRE-CHARGE_COMPLETE_FLAG equal to true. After step 410, the method is exited.

Referring to FIG. 7, a table 450 of exemplary PACK_VOLTAGE values, LINK_VOLTAGE values, AVERAGE_LINK_VOLTAGE values, I_AVERAGE values, P_AVERAGE values, and E_TOTAL values determined over time while the pre-charging system 30 is charging the capacitor 62 are illustrated. The PACK_VOLTAGE values correspond to values indicating voltage levels measured by the voltage measuring circuit 220 between the high voltage terminal 174 and the ground terminal 176 of the battery pack 20. The LINK_VOLTAGE values correspond to values indicating voltage levels measured by the voltage measuring circuit 220 between the electrical line 102 and the ground terminal 176. The LINK_VOLTAGE values also correspond to voltage levels across the capacitor 62. The AVERAGE_LINK_VOLTAGE values are determined based on an associated equation described in the above flowchart. Also, the I_AVERAGE values are determined based on an associated equation described in the above flowchart. Further, the P_AVERAGE values are determined based on an associated equation described in the above flowchart. Finally, the E_TOTAL values are determined based on an associated equation described in the above flowchart.

Figure 8:
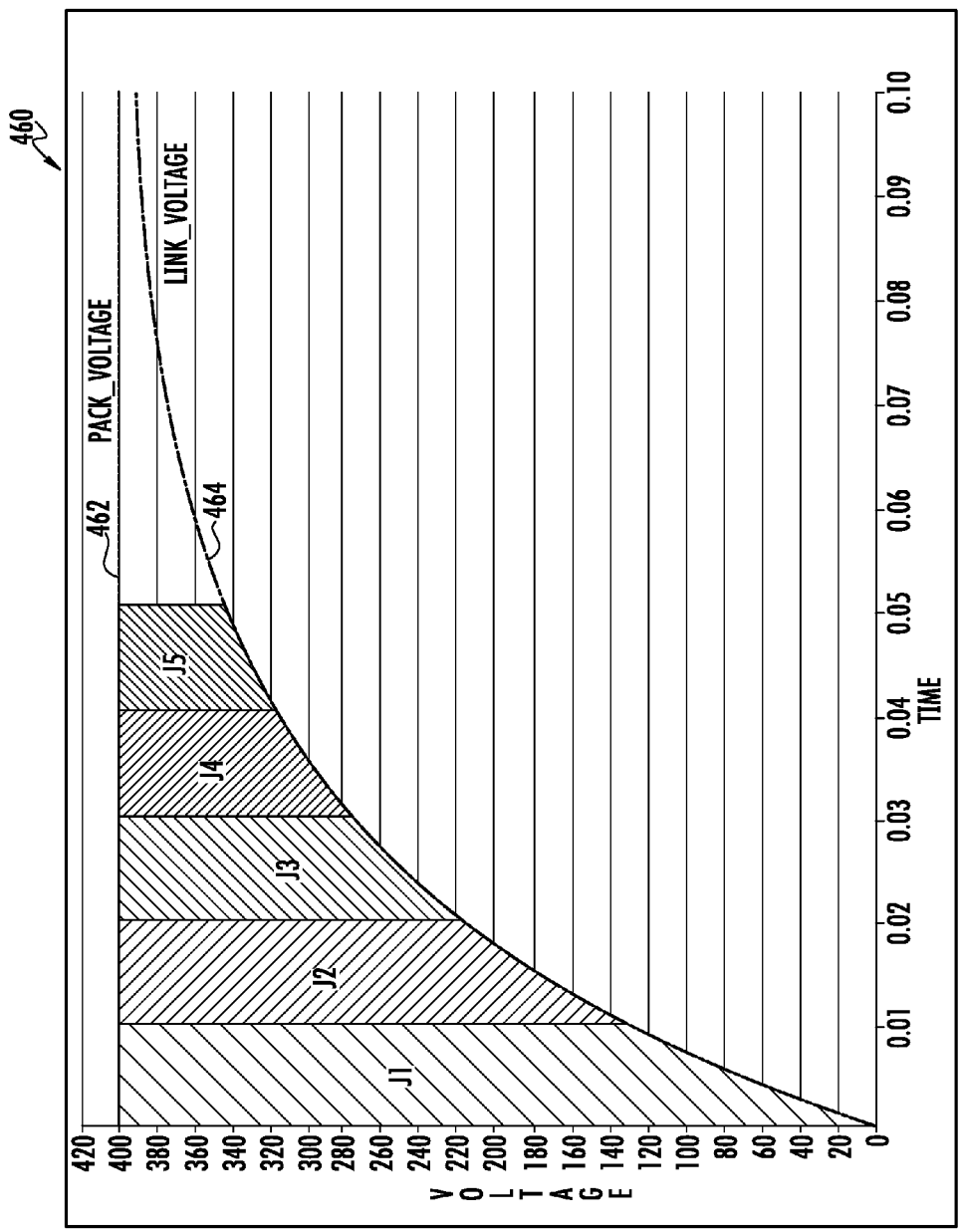
FIG. 8 is a graphical schematic illustrating the pack voltage values and the link voltage values of FIG. 7.

Referring to FIG. 8, a graph 460 graphically illustrates the PACK_VOLTAGE values, the LINK_VOLTAGE values, and the E_TOTAL values of the table 450 of FIG. 7. As shown, the E_TOTAL values indicate a total amount of energy supplied to the resistor 214 over time which is represented by an area between the curve 462 and the curve 464.

The pre-charging system and the method provide a substantial advantage over other systems and methods. In particular, the pre-charging system and the method provide a technical effect of charging a capacitor in a voltage inverter for an electric motor while limiting a total amount of energy supplied to a resistor electrically coupled to the capacitor.

The above-described method can be at least partially embodied in the form of one or more computer readable media having computer-executable instructions for practicing the methods. The computer-readable media can comprise one or more of the following: hard drives, RAM memory, flash memory, and other computer-readable media known to those skilled in the art; wherein, when the computer-executable instructions are loaded into and executed by one or more microprocessors, the one or more microprocessors become programmed for practicing at least a portion of the above methods.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A pre-charging system for a capacitor in a voltage inverter for an electric motor, comprising:
    a grounding contactor electrically coupled between a grounding terminal of a battery pack and a first end of the capacitor in the voltage inverter;
    a pre-charging contactor and a resistor electrically coupled in series with one another, the pre-charging contactor and the resistor electrically coupled between a high voltage terminal of the battery pack and a second end of the capacitor in the voltage inverter;
    a microprocessor programmed to generate a first control signal to induce the grounding contactor to have a closed operational position to electrically couple the grounding terminal of the battery pack to the first end of the capacitor;
    the microprocessor further programmed to generate a second control signal to induce the pre-charging contactor to have a closed operational position to electrically couple the high voltage terminal through the resistor to the second end of the capacitor;
    a voltage measurement circuit configured to measure a first voltage level between the high voltage terminal and the grounding terminal of the battery pack;
    the voltage measurement circuit further configured to generate a first voltage value indicating the first voltage level that is received by the microprocessor;
    the voltage measurement circuit further configured to measure second, third, and fourth voltage levels between a first electrical line and the grounding terminal of the battery pack at first, second, and third times, respectively, the first electrical line being electrically coupled in series between the resistor and the second end of the capacitor, the third time being after the second time, the second time being after the first time;
    the voltage measurement circuit further configured to generate second, third, and fourth voltage values indicating the second, third, and fourth voltage levels, respectively, that are received by the microprocessor;
    the microprocessor further programmed to determine a total amount of energy supplied to the resistor between the first time and the third time based on the first, second, third, and fourth voltage values and a resistance level of the resistor; and
    the microprocessor further programmed to stop generating the second control signal to induce the pre-charging contactor to have an open operational position to electrically de-couple the high voltage terminal from the second end of the capacitor, if the total amount of energy is greater than a threshold amount of energy.

2. The pre-charging system of claim 1, wherein the microprocessor further programmed to stop generating the second control signal comprises:
    the microprocessor programmed to stop generating the second control signal to induce the pre-charging contactor to have the open operational position to electrically de-couple the high voltage terminal from the second end of the capacitor, if the total amount of energy is greater than the threshold amount of energy, or an amount of time between the first and third times is greater than a threshold amount of time, or the fourth voltage is greater than or equal to a threshold voltage value.

3. The pre-charging system of claim 1, wherein:
    the microprocessor further programmed to determine a first average amount of energy supplied to the resistor between the first time and the second time based on the first, second, third voltage values and the resistance level of the resistor;
    the microprocessor further programmed to determine a second average amount of energy supplied to the resistor between the second time and the third time based on the first, third, and fourth voltage values and the resistance level of the resistor;

the microprocessor further programmed to determine the total amount of energy supplied to the resistor based on the first average amount of energy and the second average amount of energy.

4. The pre-charging system of claim 3, wherein the microprocessor is further programmed to determine an average voltage value indicating an average voltage level between the first electrical line and the grounding terminal of the battery pack between the first and second times, based on the second and third voltage values.

5. The pre-charging system of claim 4, wherein the microprocessor is further programmed to determine an average amount of electrical current flowing through the resistor between the first and second times, based on the first voltage value, the average voltage value, and the resistance level of the resistor.

6. The pre-charging system of claim 5, wherein the microprocessor is further programmed to determine an average amount of power dissipated by the resistor between the first and second times, based on the average amount of electrical current and the resistance level of the resistor.

7. The pre-charging system of claim 6, wherein the microprocessor is further programmed to determine the first average amount of energy supplied to the resistor based on the average amount of power and an amount of time between the first time and the second time.

8. A method for charging a capacitor in a voltage inverter for an electric motor, comprising:

providing a pre-charging circuit having a grounding contactor, a pre-charging contactor, a resistor, a voltage measurement circuit, and a microprocessor; the grounding contactor electrically coupled between a grounding terminal of a battery pack and a first end of the capacitor in the voltage inverter; the pre-charging contactor and the resistor electrically coupled in series with one another, the pre-charging contactor and the resistor electrically coupled between a high voltage terminal of the battery pack and a second end of the capacitor in the voltage inverter;

generating a first control signal to induce the grounding contactor to have a closed operational position to electrically couple the grounding terminal of the battery pack to the first end of the capacitor, utilizing the microprocessor;

generating a second control signal to induce the pre-charging contactor to have a closed operational position to electrically couple the high voltage terminal through the resistor to the second end of the capacitor, utilizing the microprocessor;

measuring a first voltage level between the high voltage terminal and the grounding terminal of the battery pack, utilizing the voltage measurement circuit;

generating a first voltage value indicating the first voltage level that is received by the microprocessor, utilizing the voltage measurement circuit;

measuring second, third, and fourth voltage levels between a first electrical line and the grounding terminal of the battery pack at first, second, and third times, respectively, utilizing the voltage measurement circuit, the first electrical line being electrically coupled in series between the resistor and the second end of the capacitor, the third time being after the second time, the second time being after the first time;

generating second, third, and fourth voltage values indicating the second, third, and fourth voltage levels, respectively, that are received by the microprocessor, utilizing the voltage measurement circuit;

determining a total amount of energy supplied to the resistor between the first time and the third time based on the first, second, third, and fourth voltage values and a resistance level of the resistor, utilizing the microprocessor; and stopping the generating of the second control signal to induce the pre-charging contactor to have an open operational position to electrically de-couple the high voltage terminal from the second end of the capacitor, if the total amount of energy is greater than a threshold amount of energy, utilizing the microprocessor.

9. The method of claim 8, wherein stopping the generating of the second control signal comprises:

stopping the generating of the second control signal to induce the pre-charging contactor to have the open operational position to electrically de-couple the high voltage terminal from the second end of the capacitor, if the total amount of energy is greater than the threshold amount of energy, or an amount of time between the first and third times is greater than a threshold amount of time, or the fourth voltage value is greater than or equal to a threshold voltage value, utilizing the microprocessor.

10. The method of claim 8, further comprising:

determining a first average amount of energy supplied to the resistor between the first time and the second time based on the first, second, third voltage values and the resistance level of the resistor, utilizing the microprocessor;

determining a second average amount of energy supplied to the resistor between the second time and the third time based on the first, third, and fourth voltage values and the resistance level of the resistor, utilizing the microprocessor; and determining the total amount of energy supplied to the resistor based on the first average amount of energy and the second average amount of energy, utilizing the microprocessor.

11. The method of claim 10, further comprising determining an average voltage value indicating an average voltage level between the first electrical line and the grounding terminal of the battery pack between the first and second times, based on the second and third voltage values, utilizing the microprocessor.

12. The method of claim 11, further comprising determining an average amount of electrical current flowing through the resistor between the first and second times, based on the first voltage values, the average voltage value, and the resistance level of the resistor.

13. The method of claim 12, further comprising determining an average amount of power dissipated by the resistor between the first and second times, based on the average amount of electrical current and the resistance level of the resistor, utilizing the microprocessor.

14. The method of claim 13, further comprising determining the first average amount of energy supplied to the resistor based on the average amount of power and an amount of time between the first time and the second time, utilizing the microprocessor.

* * * * *